United States Patent
Tsumaki et al.

(10) Patent No.: US 8,703,317 B2
(45) Date of Patent: Apr. 22, 2014

(54) BATTERY PACK

(75) Inventors: Toshimichi Tsumaki, Tokyo (JP); Fumihiro Akahane, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/387,287

(22) PCT Filed: Oct. 28, 2010

(86) PCT No.: PCT/JP2010/069163
§ 371 (c)(1), (2), (4) Date: Apr. 13, 2012

(87) PCT Pub. No.: WO2011/080960
PCT Pub. Date: Jul. 7, 2011

(65) Prior Publication Data
US 2012/0189886 A1    Jul. 26, 2012

(30) Foreign Application Priority Data
Jan. 4, 2010  (JP) ................. P2010-000108

(51) Int. Cl.
*H01M 2/10* (2006.01)
*H01M 2/12* (2006.01)

(52) U.S. Cl.
USPC ............................................. 429/99; 429/87

(58) Field of Classification Search
None
See application file for complete search history.

(56) References Cited

FOREIGN PATENT DOCUMENTS

| JP | 05-343106 | * | 6/1992 | ............ H01M 10/50 |
|----|-----------|---|--------|------------------------|
| JP | 5-343105 A | | 12/1993 | |
| JP | 5-343106 A | | 12/1993 | |
| JP | 2000-294302 A | | 10/2000 | |
| JP | 2001-167803 A | | 6/2001 | |
| JP | 2002-313440 A | | 10/2002 | |
| JP | 2004-288527 | * | 10/2004 | ............ H01M 10/50 |
| JP | 2004-288527 A | | 10/2004 | |
| JP | 2005-116342 A | | 4/2005 | |
| JP | 2005-166570 A | | 6/2005 | |
| JP | 2005-183241 A | | 7/2005 | |
| JP | 2005-209367 A | | 8/2005 | |
| JP | 2005-209369 A | | 8/2005 | |
| JP | 2006-179190 A | | 7/2006 | |

OTHER PUBLICATIONS

English translation of Kimoto et al (JP 2004-288527).*
English translation of Mita (JP 05-343106).*
PCT/ISA/210—International Search Report dated Dec. 21, 2010 for PCT/JP2010/069163.
PCT/ISA/237—Written Opinion of the International Searching Authority dated Dec. 21, 2010 for PCT/JP2010/069163.
Japanese Office Action issued in Japanese Patent Application No. 2010-000108 on Aug. 6, 2013.
Japanese Notice of Allowance dated Nov. 12, 2013.

* cited by examiner

*Primary Examiner* — Yoshitoshi Takeuchi
(74) *Attorney, Agent, or Firm* — Birch, Stewart, Kolasch & Birch, LLP

(57) ABSTRACT

A battery pack includes a battery chamber (3) which houses a plurality of battery cells (2), a cooling air chamber (4) provided below the battery chamber (3), and a fan (5) which supplies cooling air (A) into the cooling air chamber (4) at a static pressure not less than atmospheric pressure. On a bottom part of the battery chamber (3), there is provided a supporting part (6) which supports the battery cells (2) while maintaining horizontal gaps therebetween, and air inlet holes (7) which guide cooling air (A) upward are provided in the bottom part of the battery chamber (3) at positions corresponding to the gaps between the battery cells (2).

9 Claims, 2 Drawing Sheets

BATTERY PACK

BACKGROUND OF THE INVENTION

1. Field of the Invention

The present invention relates to a battery pack which houses a plurality of batteries and which is to be mounted on a vehicle or the like.

Priority is claimed on Japanese Patent Application No. 2010-000108, filed Jan. 4, 2010, the content of which is incorporated herein by reference.

2. Description of the Related Art

In general, a battery pack which houses an assembled battery with battery cells connected in series or in parallel, together with peripheral devices, requires a cooling mechanism for cooling heated battery cells. This cooling mechanism uses a fan or the like attached to the casing of the battery pack to take outside air into the interior of the battery pack casing and cause it to travel through between battery cells, thereby cooling the heated battery cells.

For example, Patent Document 1 discloses a battery pack in which an assembled battery is housed within a battery housing casing, and a cooling airstream flowing into the battery casing through an opening part provided in the battery housing casing, cools each battery module of the assembled battery. The battery module is configured with a plurality of battery cells. This opening part provided in the battery housing casing has an opening/closing valve provided therein, and this opening/closing valve is opened when supplying a cooling airstream into the battery housing casing, and is closed when a cooling airstream is not supplied.

In the battery housing casing, there are provided an air inlet chamber and an air discharge chamber, and between the air inlet chamber and the air discharge chamber there is arranged the assembled battery. Air that is drawn into the air inlet chamber (cooling airstream) travels through between the respective battery modules of the assembled battery and is discharged from the air discharge chamber, thereby cooling the respective battery modules.

Prior Art Documents

Patent Documents

[Patent Document 1] Japanese Unexamined Patent Application, First Publication No. 2001-167803

SUMMARY OF INVENTION

Problems to be Solved by the Invention

However, in a conventional battery pack, the temperature of the cooling airstream flowing from the fan rises gradually due to heat exchange with the battery cells. Consequently, the level of cooling efficiency drops for battery cells positioned further from the fan compared to those positioned close to the fan, and the temperature of the battery cells becomes uneven.

Moreover, in the battery pack according to Patent Document 1, air entering from the inlet (air inlet chamber part) has a flow (flow velocity), and the flow velocity drops gradually within the flow destination compartment, and the flow comes to stop when it reaches the end of the compartment. Consequently, the flow ascends upward depending on the position, and the amount of airstream for cooling the battery cells becomes uneven. For example, it may be considered that at an end portion where the air comes to a dead-end and stops, the air pressure rises due to the air which can no longer move to elsewhere, and the amount of cooling airstream ascending upward becomes higher.

Accordingly, there is a problem in that the temperature of the battery cells becomes uneven, and this causes unevenness to occur in the degree of performance deterioration and the life duration of the battery cells, consequently causing instability in the performance of the battery pack.

The present invention takes into consideration the above circumstances, with an object of providing a battery pack capable of uniformly cooling battery cells.

Means for Solving the Problem

In order to achieve the above object, a battery pack according to the present invention comprises: a battery chamber which houses a plurality of battery cells; a cooling air chamber provided below the battery chamber; and a fan which supplies cooling air into the cooling air chamber at a static pressure not less than atmospheric pressure. On a bottom part of the battery chamber there is provided a supporting part which supports the battery cells while maintaining horizontal gaps therebetween, and air inlet holes which guide cooling air upward are provided in the bottom part of the battery chamber at positions corresponding to the gaps between the battery cells.

In the present invention, there is provided a fan which supplies cooling air into the cooling air chamber to give a static pressure above atmospheric pressure with no air flow. Thereby, the cooling air from the cooling air chamber can flow into the battery chamber through the respective air inlet holes in the bottom part of the battery chamber, and cool the battery cells. By supplying cooling air into the cooling air chamber to give a static pressure above atmospheric pressure with no air flow, the amount of cooling air stream flowing into the battery chamber through the respective air inlet holes each having equal diameter can be made equal, and the battery cells can be uniformly cooled.

Moreover, in the battery pack according to the present invention, in the cooling air chamber there is provided a discharge outlet which discharges drain water flowing thereinto from the battery chamber.

In the present invention, in the cooling air chamber there is provided the discharge outlet which discharges drain water flowing thereinto from the battery chamber. As a result, when drain water produced as a result of condensation of the air within the battery chamber flows into the cooling air chamber through the air inlet holes, the drain water can be discharged from the discharge outlet, and accumulation of drain water within the cooling air chamber can be prevented.

Since the amount of drain water produced per hour as a result of condensation is very low, the diameter of the discharge outlet is made sufficiently small so that the air pressure in the cooling air chamber can be largely released therethrough without the pressure therein being reduced. Furthermore, when on-vehicle mounting is assumed, if a single water discharge outlet is provided in one corner, the drain water will flow appropriately and be discharged, due to the lengthwise and widthwise tilt and the acceleration of the vehicle on which the battery pack is mounted.

Moreover, in the battery pack according to the present invention, in the cooling air chamber there is provided a straightening plate for applying a uniform static pressure to the air inlet holes.

In the present invention, in the cooling air chamber there is provided the straightening plate for applying a uniform static pressure with no air flow into the air inlet holes. As a result, cooling air supplied into the cooling air chamber can flow into the battery chamber through the air inlet holes at a uniform flow rate, and the battery cells can be uniformly cooled.

Furthermore, in the battery pack according to the present invention, the gap between the air inlet holes arranged in line along the planar direction of an electrode plate inside the battery cell is greater than that between the air inlet holes arranged in line along the thickness direction of the electrode plate.

In the present invention, the gap between the air inlet holes arranged in line along the planar direction of the electrode plate inside the battery cells is greater than that between the air inlet holes arranged in line along the thickness direction of the electrode plate. As a result, the amount of cooling air to be supplied to the thickness side of the electrode plate of the battery cell can be made greater than that to be supplied to the planar side of the electrode plate. Since an electrode plate generally has a greater amount of heat release made in the planar direction than in the thickness direction, by cooling the thickness side of the electrode plate of the battery cell more than the planar side, the battery cell can be cooled efficiently.

Effect of the Invention

According to the present invention, there is provided a fan which supplies cooling air into the cooling air chamber at a static pressure above atmospheric pressure. Thereby, the amount of cooling airstream flowing into the battery chamber through each air inlet hole becomes equal, and the battery cells can be cooled uniformly. As a result, deterioration unevenness caused by uneven battery cell temperature can be suppressed, and performance of the battery pack can be stabilized.

DETAILED DESCRIPTION OF THE INVENTION

First Embodiment

Figure 1A:
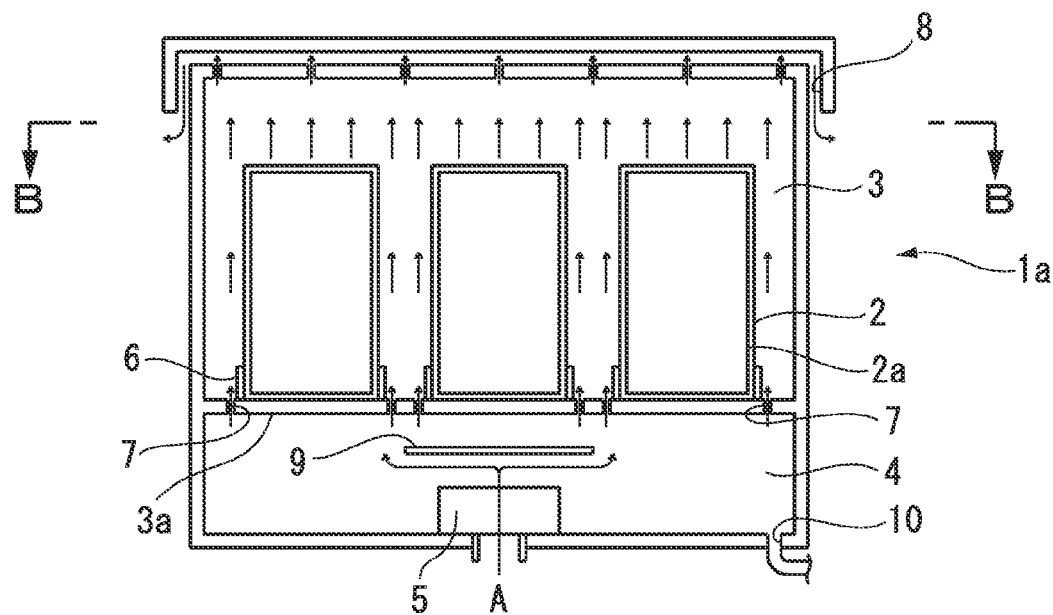
FIG. 1A is a diagram showing an example of a battery pack according to a first embodiment of the present invention, and is a sectional view taken along the line A-A of FIG. 1B.
Figure 1B:
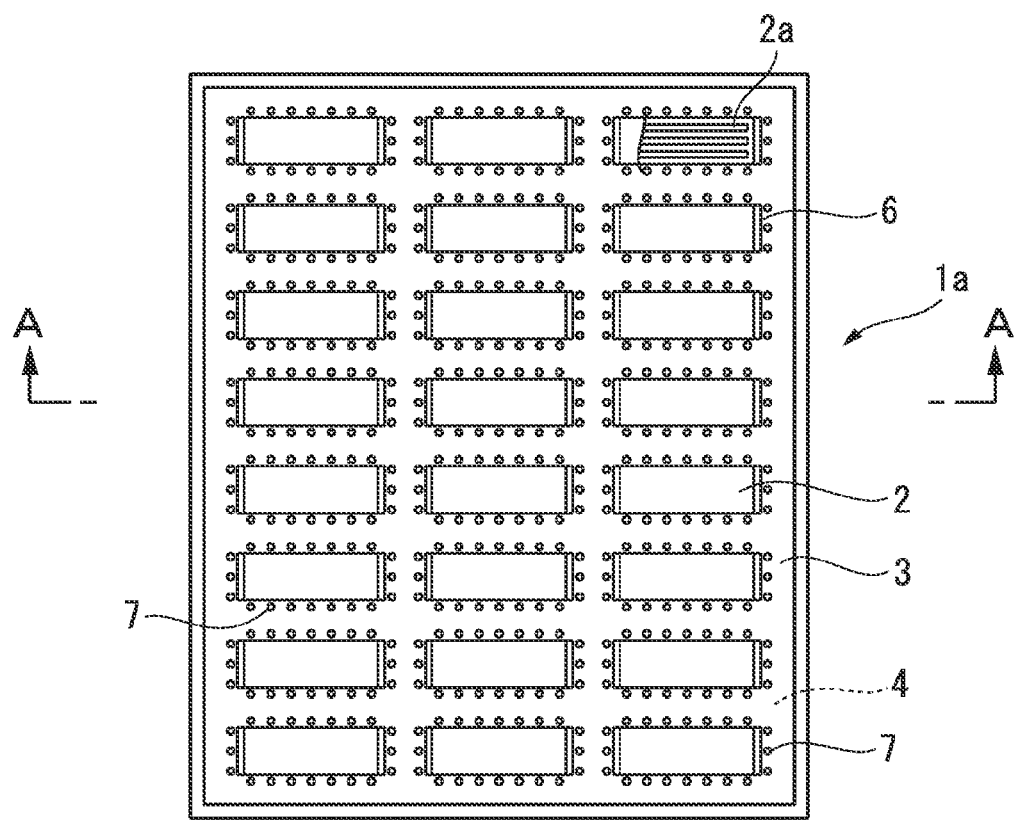
FIG. 1B is a diagram showing an example of the battery pack according to the first embodiment of the present invention, and is a sectional view taken along the line B-B of FIG. 1A.

Hereunder, a battery pack according to a first embodiment of the present invention is described, with reference to FIG. 1A and FIG. 1B.

As shown in FIG. 1A and FIG. 1B, a battery pack 1a according to the present embodiment schematically comprises a battery chamber 3 which houses a plurality of battery cells 2, a cooling air chamber 4 provided below the battery chamber 3, and a fan 5 which supplies cooling air A into the cooling air chamber 4 at a static pressure above atmospheric pressure. The battery pack 1a is mounted on a vehicle such as a forklift.

Each battery cell 2 is of a rectangular solid, and houses a plurality of electrode plates 2a thereinside.

In the battery chamber 3, on the bottom part 3a thereof, there are provided supporting parts 6 which support the battery cells 2 while maintaining horizontal gaps therebetween, and at positions corresponding to the gaps between the battery cells 2, there are provided a plurality of air inlet holes 7 which guide cooling air A of the cooling air chamber 4 upward.

The air inlet holes 7 are such that, for example, a punched metal perforated sheet may be attached to positions on the bottom part 3a of the battery chamber 3 so as to correspond to the gaps between the battery cells 2, and holes in this punched metal perforated sheet may be provided as the air inlet holes 7.

The air inlet holes 7 may be provided along the periphery of the battery cells 2 at equal intervals, or may be randomly provided between two battery cells.

Above the battery chamber 3 there is provided an air discharge outlet 8 for discharging the air inside the battery chamber 3 to the outside.

In the cooling air chamber 4 there is provided a straightening plate 9 for reducing the kinetic energy of cooling air A and equalizing the static pressure within the cooling air chamber 4. The straightening plate 9 is provided above the fan 5 with a clearance from the fan 5, and the planar shape thereof is formed greater than the planar outer shape of the fan 5. Moreover, between the straightening plate 9 and the air inlet holes 7, there is provided a predetermined clearance.

With this configuration, the static pressure of the cooling air chamber 4 can be made uniform, and cooling air A can be uniformly supplied into the battery chamber 3 through the respective air inlet holes 7.

In the bottom part of the cooling air chamber 4 there is provided a water discharge outlet 10 for discharging drain water.

Next, a method of cooling the battery cells 2 is described, with reference to the drawings.

First, the fan 5 is driven to supply cooling air A from the outside of the battery pack 1a into the cooling air chamber 4 at a static pressure above atmospheric pressure.

The cooling air A inside the cooling air chamber 4 is introduced into the battery chamber 3 through the air inlet holes 7 and is then ejected upward due to the static pressure, thereby generating an upward airstream within the battery chamber 3. The cooling air A then travels through between the battery cells 2, and cools the heated battery cells 2.

As a result of the cooling air A flowing into the battery chamber 3 from the cooling air chamber 4, air in the upper portion of the battery chamber 3 is discharged to the outside through the air discharge outlet 8.

"Static pressure" in the present embodiment refers to a pressure within the duct (within the cooling air chamber 4). In the present embodiment, the pressure and flow of the air supply is much higher than for the air discharged from the duct. Therefore, the pressure of a "still" portion that excludes the vicinity of the air discharge portion and the air supply portion where there is a flow in pressure, where there is almost no air flow, that is, substantially the entire area within the duct, is referred to as a "static pressure".

Although there is no particular limitation on the static pressure of the cooling air A in the cooling air chamber 4 after the kinetic energy has been reduced by the straightening plate 9, this is preferably the atmospheric pressure outside the battery pack plus several hundred Pa (approximately 200 to 500 Pa) or higher.

At this time, because the battery pack 1a may be used in a cold region or a highly humid region in some cases, the moisture content of the cooling air A may form condensation, and drain water may occur as a result after the cooling air A inside the cooling air chamber 4 has flowed into the battery chamber 3. Particularly, in those cases where a vehicle such as a forklift with a battery pack 1a mounted thereon is used in a refrigerated storage or the like and is operated to shuttle between a low-temperature environment and a normal-temperature environment, water vapor of the cooling air A may form condensation, and drain water may occur as a result.

If drain water occurs in the battery chamber 3, it flows into the cooling air chamber 4 from the air inlet holes 7 in the bottom part of the battery chamber 3, and since the water discharge outlet 10 is provided in the cooling air chamber 4, the drain water can be discharged to the outside. The diameter of the water discharge outlet 10 is made sufficiently small so that the air pressure in the cooling air chamber 4 can be largely released therethrough without the pressure therein being reduced. Moreover, a drain water trap or the like may be provided for the water discharge outlet 10.

Next, operation of the above-mentioned battery pack 1a is described, with reference to the drawings.

In the battery pack 1a according to the present embodiment, by providing the fan 5 which supplies cooling air A into the cooling air chamber 4 to give a static pressure above atmospheric pressure with no air flow, the amount of airstream of cooling air A flowing into the battery chamber 3 from the respective air inlet holes 7 can be equalized, and if the air inlet holes 7 around each battery cell 2 are arranged equally, the battery cells 2 can be uniformly cooled.

The above-mentioned battery pack 1a according to the first embodiment is capable of uniformly cooling the battery cells 2. Therefore, uneven deterioration in the battery cells 2 can be suppressed, and stable performance can be achieved.

Next, another embodiment is described with reference to the accompanying drawings. The same reference symbols are used to denote the same or similar members and portions as those in the above first embodiment and descriptions thereof are omitted, and configurations which differ from those in the first embodiment are described.

Second Embodiment

Figure 2A:
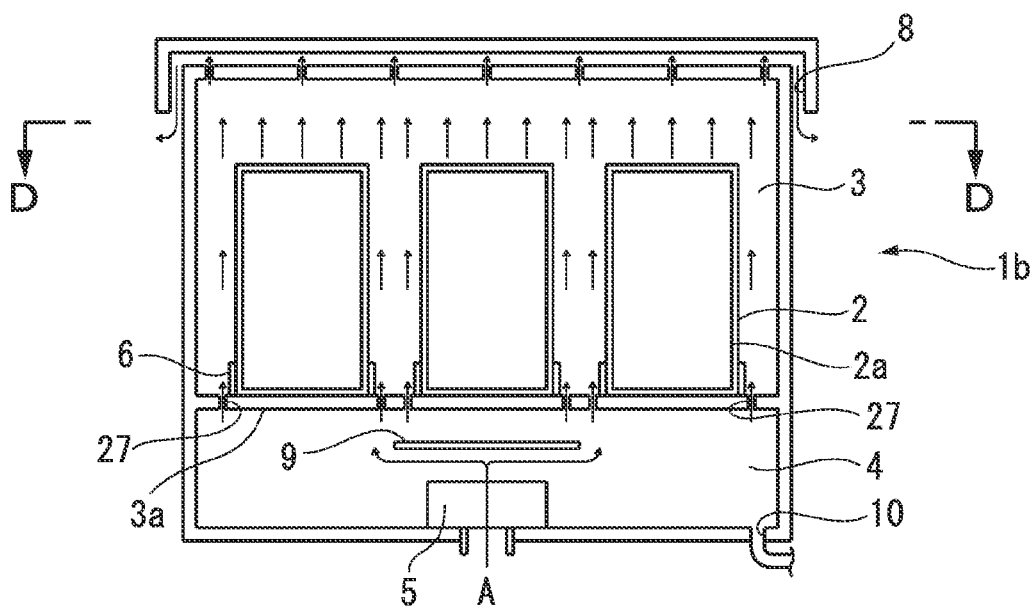
FIG. 2A is a diagram showing an example of a battery pack according to a second embodiment of the present invention, and is a sectional view taken along the line C-C of FIG. 2B.
Figure 2B:
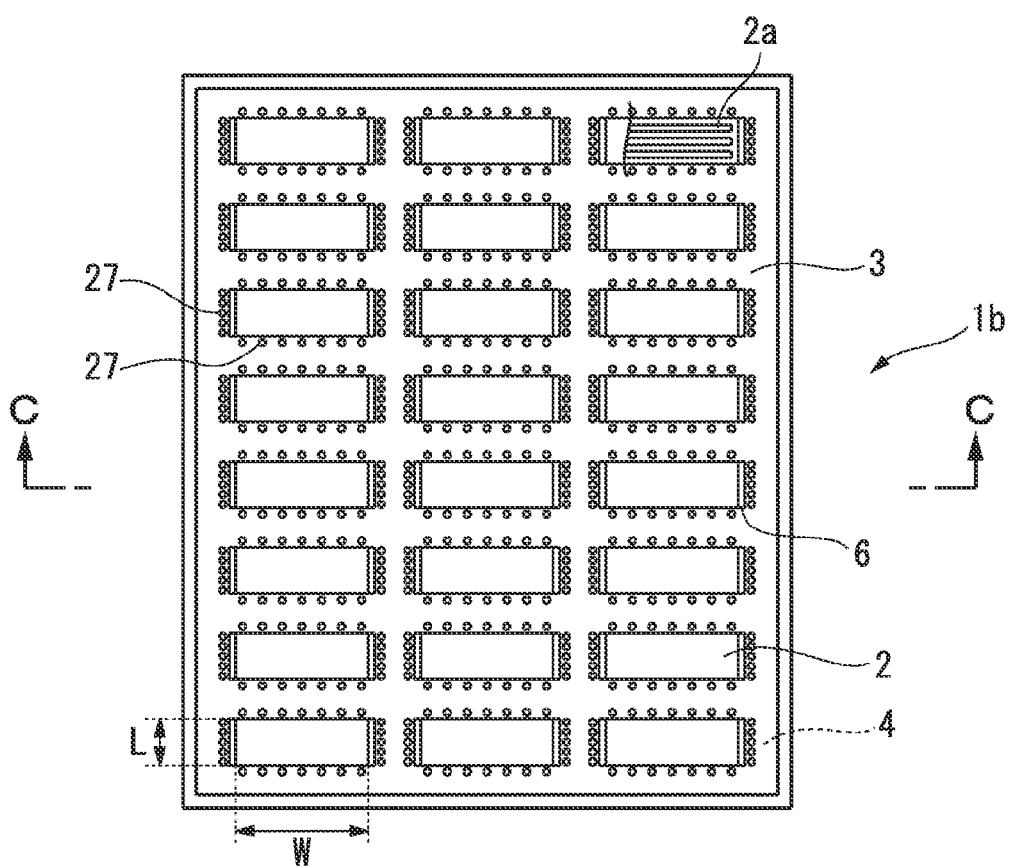
FIG. 2B is a diagram showing an example of the battery pack according to the second embodiment of the present invention, and is a sectional view taken along the line D-D of FIG. 2A.

As shown in FIGS. 2A and 2B, a battery pack 1b according to a second embodiment is configured such that gaps between air inlet holes 27 arranged in line along the planar direction of an electrode plate 2a in a battery cell 2 are greater than those between the air inlet holes 27 arranged in line along the thickness direction of the electrode plate 2a. A greater amount of cooling air A can be supplied to the thickness side of the electrode plate 2a of the battery cell 2 than to the planar side of the electrode plate 2a.

Here, the planar direction refers to the widthwise direction W of the electrode plate 2a in the D-D line sectional view (plan view) of the battery pack 1b illustrated in FIG. 2B. The thickness direction refers to the lengthwise direction L of the electrode plate 2a on the plan view of the battery pack 1b.

Since an electrode plate 2a has a greater amount of heat release in the thickness direction than in the planar direction, by cooling the thickness side 2c of the electrode plate 2a of the battery cell 2 more than the planar side 2d, the battery cell 2 can be cooled efficiently.

In the battery pack 1b according to the second embodiment, while achieving the same or similar effect as that of the first embodiment, the supply amount of cooling air A can be adjusted by adjusting the arrangement of the air inlet holes 27 according to the difference in the heat release amount between the directions of the battery cell 2. As a result, the battery cell 2 can be cooled efficiently.

The embodiments of the battery pack according to the present invention have been described. However, the present invention is not limited by the above embodiments, and various modifications may be made without departing from the scope of the invention.

For example, in the above embodiments, the cooling air chamber 4 is provided with the straightening plate 9. However, the cooling air chamber 4 need not be provided with the straightening plate 9.

Moreover, for example in the above embodiments, the cooling air chamber 4 is provided with the water discharge outlet 10. However, the configuration need not be provided with the water discharge outlet 10. Moreover, a container or the like for accommodating drain water may be provided in the cooling air chamber 4.

Description of the Reference Symbols 1a, 1b: Battery pack
2: Battery cell
2a: Electrode plate
3: Battery chamber
3a: Bottom part
4: Cooling air chamber
5: Fan
6: Supporting part
7, 27: Air inlet hole
9: Straightening plate
10: Water discharge outlet
A: Cooling air

The invention claimed is:

1. A battery pack comprising:
(a) a battery chamber which houses a plurality of battery cells;
(b) a cooling air chamber provided below said battery chamber; and
(c) a fan which supplies cooling air into said cooling air chamber at a static pressure not less than atmospheric pressure;
(d) an air discharge outlet provided above said battery chamber and configured to discharge air inside said battery chamber to an outside of said battery pack;
(e) a bottom part that separates said cooling air chamber and said battery chamber, and on which said plurality of battery cells is placed, said bottom part being provided with air inlet holes which guide cooling air upward at positions corresponding to gaps between said plurality of battery cells
wherein each gap between said plurality of battery cells has a plurality of air inlet holes; and
(f) a straightening plate provided in said cooling chamber for diffusing kinetic energy of said cooling air and equalizing said static pressure within said cooling air chamber, wherein said straightening plate is provided above said fan with a clearance from said fan, and a planar shape of said straightening plate is formed greater than a planar outer shape of said fan
and both said straightening plate and said bottom part are oriented orthogonally to the air flow initially resulting from the fan.

2. A battery pack according to claim 1, wherein in said cooling air chamber there is provided a discharge outlet which discharges drain water flowing thereinto from said battery chamber.

3. A battery pack according to claim 1, wherein said straightening plate is configured to apply a uniform static pressure to said air inlet holes.

4. A battery pack according to claim 1, wherein a gap between said air inlet holes arranged in line along a planar direction of an electrode plate in said battery cell is greater than a gap between said air inlet holes arranged in line along a thickness direction of said electrode plate.

5. A battery pack according to claim 2, wherein said straightening plate is configured to apply a uniform static pressure to said air inlet holes.

6. A battery pack according to claim 2, wherein each of said battery cells includes an electrode plate, and a gap between said air inlet holes arranged in line along a planar direction of said electrode plate in said battery cell is greater than a gap between said air inlet holes arranged in line along a thickness direction of said electrode plate.

7. A battery pack according to claim 3, wherein each of said battery cells includes an electrode plate, and a gap between said air inlet holes arranged in line along a planar direction of said electrode plate in said battery cell is greater than a gap between said air inlet holes arranged in line along a thickness direction of said electrode plate.

8. A battery pack according to claim 5, wherein each of said battery cells includes an electrode plate, and a gap between said air inlet holes arranged in line along a planar direction of said electrode plate in said battery cell is greater than a gap between said air inlet holes arranged in line along a thickness direction of said electrode plate.

9. A battery pack according to claim 1, further comprising:
a supporting part which supports said battery cells while maintaining horizontal gaps between said battery cells.

\* \* \* \* \*